May 15, 1962
V. BUSH
3,034,945
PROCESS OF FORMING A SHEET FROM GLASS
FRAGMENTS AND PLASTIC
Filed March 9, 1953
5 Sheets-Sheet 2
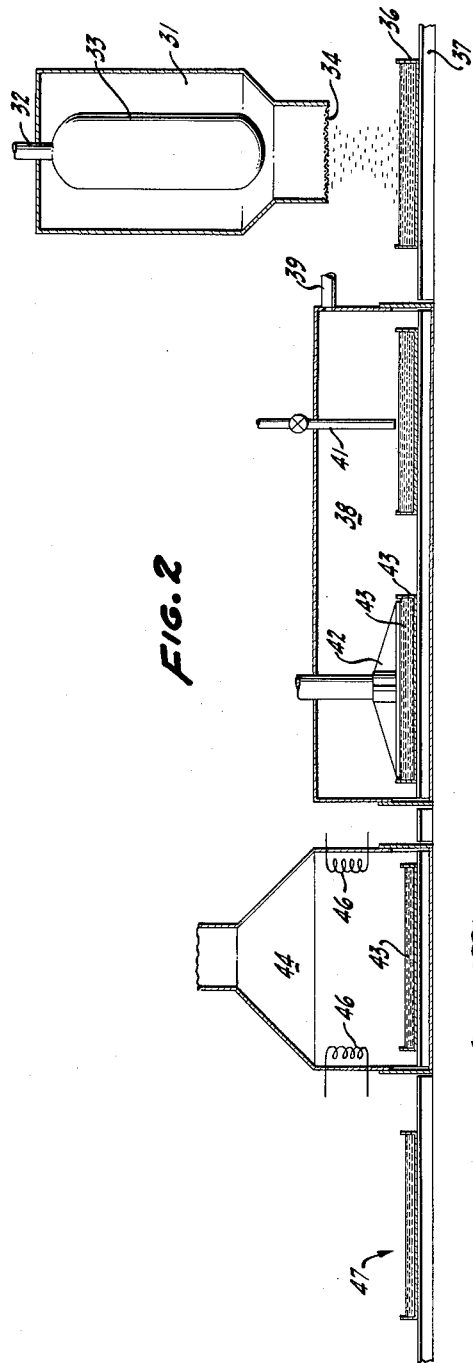
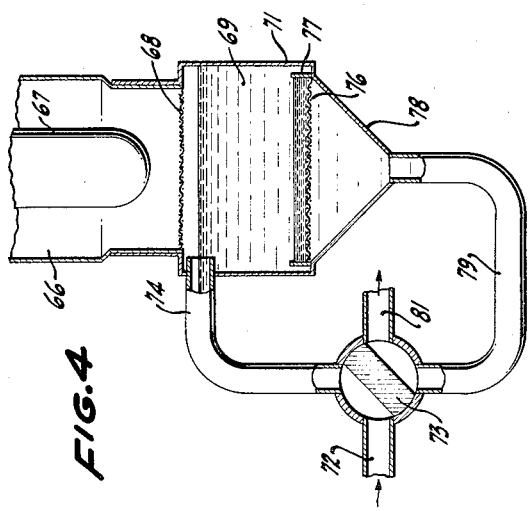
INVENTOR
VANNEVAR BUSH
BY *Maurus Lothrop*
ATTORNEY

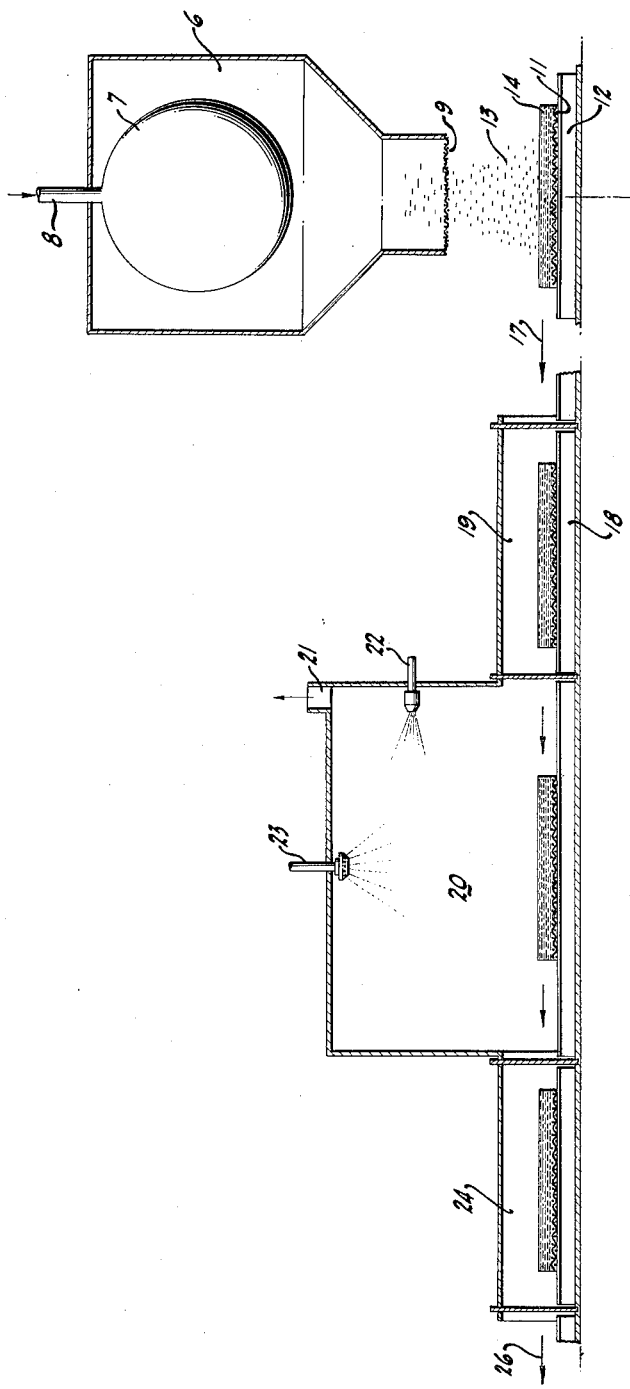

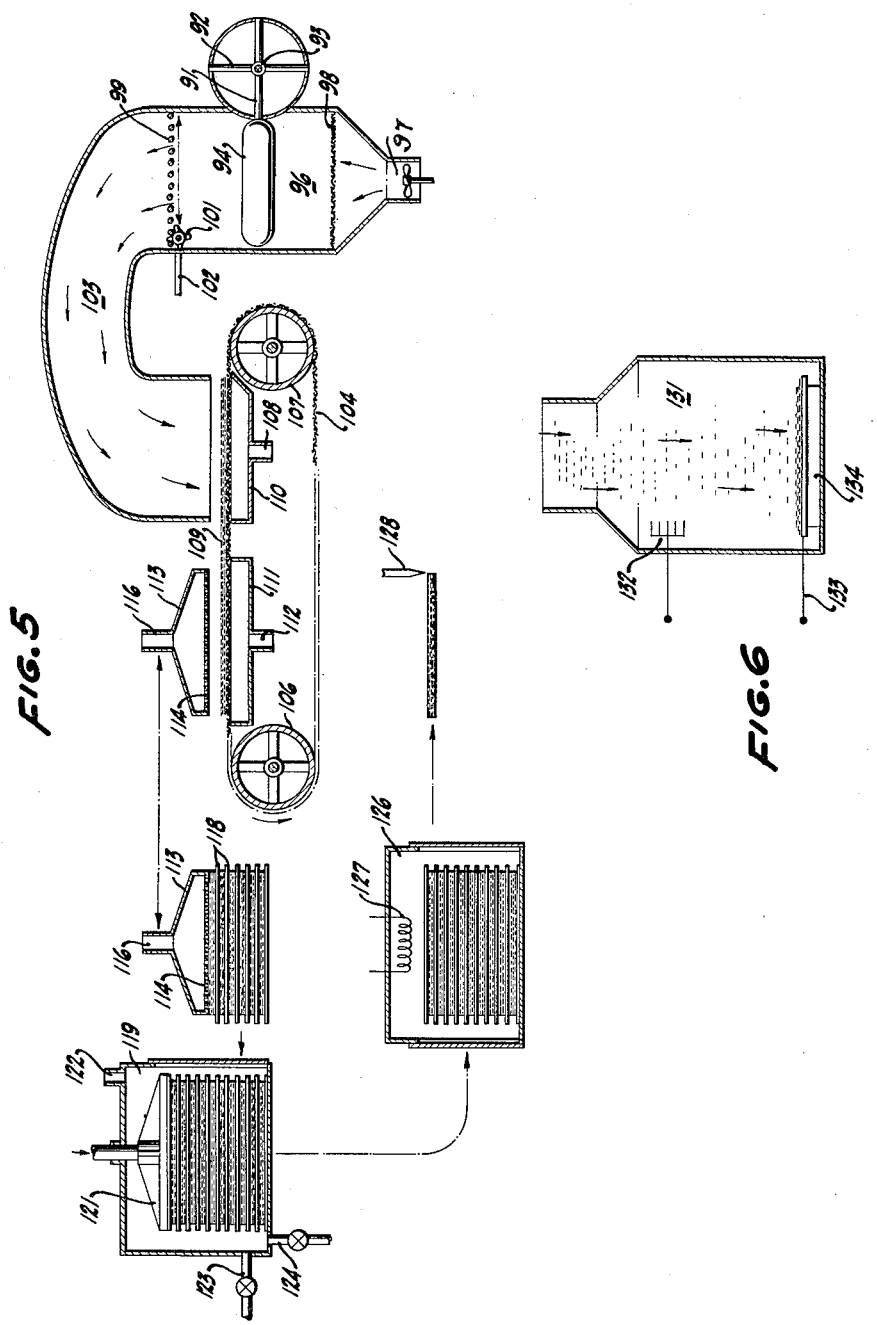

May 15, 1962
V. BUSH
3,034,945
PROCESS OF FORMING A SHEET FROM GLASS
FRAGMENTS AND PLASTIC
Filed March 9, 1953
5 Sheets-Sheet 4
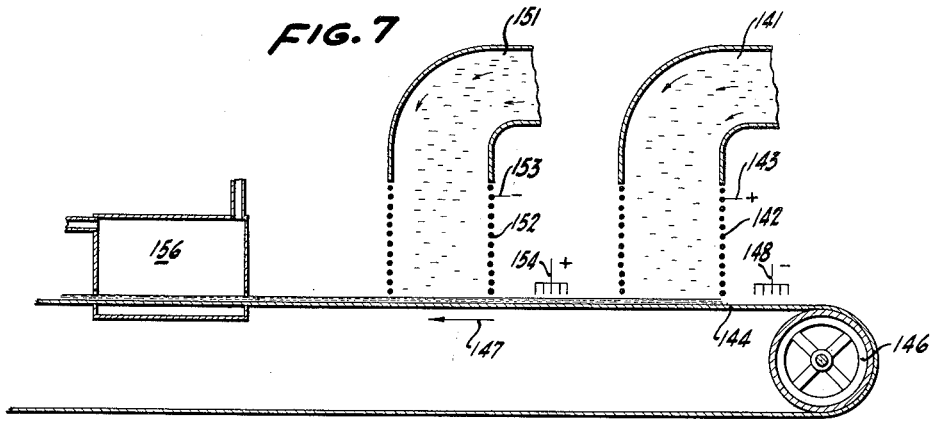
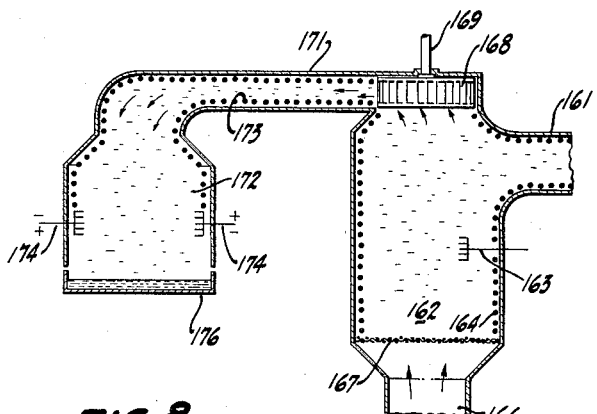
INVENTOR
VANNEVAR BUSH
BY *Marcus Lothrop*
ATTORNEY May 15, 1962
V. BUSH
3,034,945
PROCESS OF FORMING A SHEET FROM GLASS
FRAGMENTS AND PLASTIC
Filed March 9, 1953
5 Sheets-Sheet 5
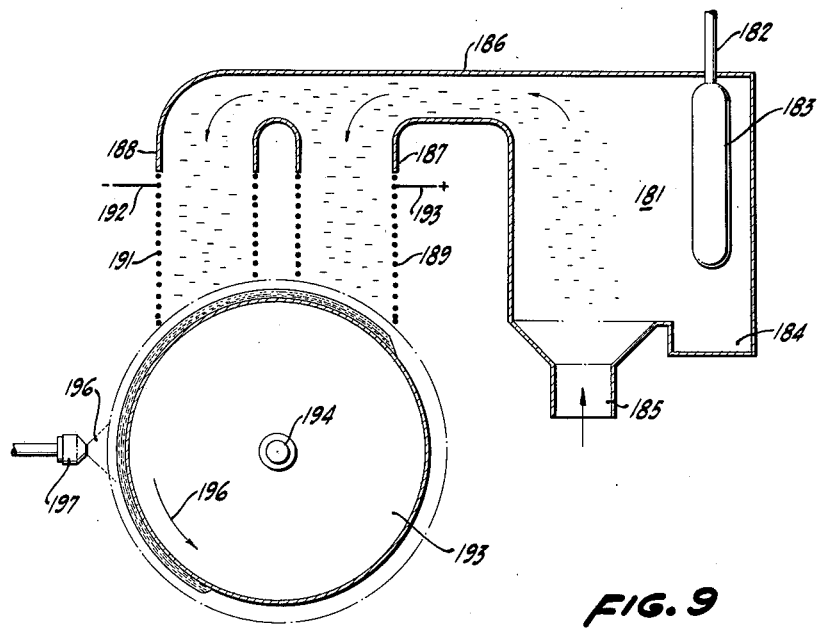
FIG. 9
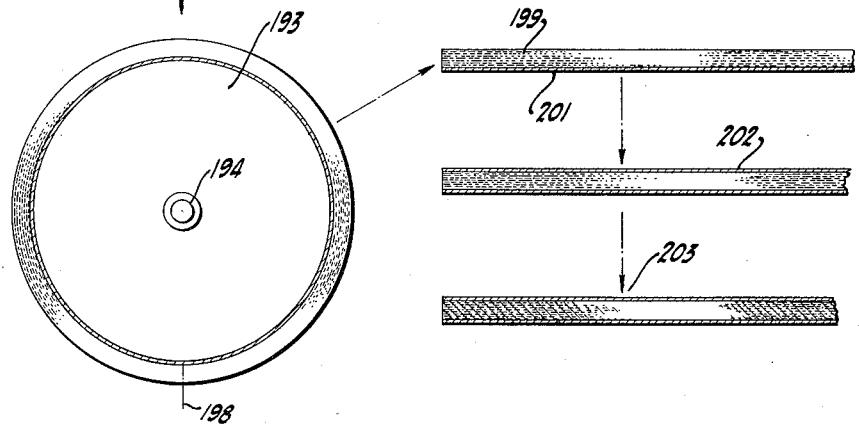
INVENTOR
VANNEVAR BUSH
BY Marcus Lothrop
ATTORNEY

United States Patent Office 3,034,945
Patented May 15, 1962

3,034,945
PROCESS OF FORMING A SHEET FROM GLASS FRAGMENTS AND PLASTIC
Vannevar Bush, Jaffrey, N.H., assignor to Carnegie Institution of Washington
Filed Mar. 9, 1953, Ser. No. 341,001
2 Claims. (Cl. 156—33)

My invention relates to a new article of manufacture comprised of glass fragments, plates, or films, slightly curved or approximately planar in contour, irregular in outline, very thin in section and oriented in a particular way. The fragments are very firmly bound together by various forces particularly effective at short range, and sometimes also by an interstitial, impregnating, plastic medium. The result is the formation of an exceedingly strong structural member such as a sheet. My invention also relates to various methods of manufacturing my new article. Various techniques are employed for supplying the fragmentary glass material and for handling, orienting, combining and holding the fragmentary glass material in its final form.

Glass is possessed of considerable strength when it is embodied in particularly favorable forms or shapes. Glass spun or otherwise formed into an elongated fiber of very small cross section has a markedly increased ability to withstand tensile forces acting on the glass fiber in the direction of its length. A bundle of fine glass fibers parallel to each other and preferably secured together in some fashion, has a considerably increased strength over a single, solid strand of glass of cross section similar to the bundle. This increased strength, however, is only in the direction of the length of the fibers. The relative increase in tensile strength which accompanies reduction in cross section is very marked. One of the theories to explain why glass becomes stronger per unit of cross sectional area as the thickness decreases ascribes failure to the presence of exceedingly minute cracks or incipient cracks. As the glass becomes thinner there is less and less room for such cracks and hence less and less stress concentration to cause rupture. Tensile strengths of 600,000 pounds per square inch are readily attained with thin fibers.

The provision of a bundle of glass fibers each of very small cross section is normally accompanied by a loss of transparency although some translucency may remain.

It is an object of my invention to provide a new article of manufacture comprised of glass which is of very considerable strength in at least two directions or dimensions.

Another object of my invention is to provide a new article of manufacture of glass in high strength form that may be translucent or even approach transparency.

A still further object of the invention is to provide a relatively inexpensive, practical article largely comprised of glass and of quite considerable structural strength in at least two dimensions or directions.

A still further object of my invention is in general to provide an improved article of manufacture having high structural strength in two dimensions and having power to transmit radiant energy, even some in the visible spectrum.

A still further object of my invention is to provide feasible, economical methods of manufacture of the article referred to.

A still further object of the invention is to provide methods of manufacturing an article involving appropriate handling of relatively thin, irregularly shaped, approximately flat glass fragments.

Other objects of the invention together with the foregoing are attained in the forms of my article of manufacture described in the accompanying description and illustrated in the accompanying drawings and are also attained in the performance of the various methods of manufacture or processes for forming a sheet described in the accompanying description and illustrated in the accompanying drawings in which:

FIGURE 1A, to the right of the first sheet, is a diagrammatic showing of an apparatus for and the steps in a method of providing an article of manufacture in accordance with my invention. The article itself is illustrated diagrammatically and most of the showing is in cross section on a vertical, transverse plane.

FIGURE 1B is a diagrammatic cross section through apparatus useful in carrying out further steps in the production of the product of my invention.

FIGURE 2 is a diagrammatic cross section on a vertical, median plane through another form of apparatus for carrying out a process in accordance with my invention.

FIGURE 3 is a cross section on a vertical, median plane through a variant form of apparatus for carrying out a process effective to produce the product of my invention.

FIGURE 4 is a still further version shown in diagrammatic cross section on a vertical, median plane, of apparatus for constructing the product of my invention by carrying out a suitable process therefor.

FIGURE 5 is a still further version of an apparatus, shown in diagrammatic cross section on a vertical, median plane, for carrying out a process pursuant to my invention.

FIGURE 6 is a diagrammatic cross section on a vertical, median plane of a variation in one part of an apparatus for carrying out the process of my invention.

FIGURE 7 is a cross section on a vertical, median plane of a still further modified form of apparatus for practicing a variant form of my process.

FIGURE 8 is a cross section on a vertical, median plane through apparatus for practicing a variant form of a process to produce the product of my invention.

FIGURE 9 is a diagrammatic showing, for the most part being in cross section on a vertical, median plane, through a further modified form of apparatus for carrying out another process pursuant to my invention to produce an appropriate product.

The fundamental working material of my new article of manufacture is glass or quartz, referred to herein, for simplicity, as glass. It is desired to provide a product having very great strength in several direction. In many, but not necessarily all cases, the product may also have the property of passing radiant energy, particularly energy in the visible spectrum, and to do so in an economical fashion. I have provided, consequently, as an example of apparatus for carrying out one form of product making process, a large chamber 6 within which a glass shape or body 7 is blown by an ordinary glass-working tube 8, representing an especially adapted form of bottle making machine. A gob of molten glass is put on the end of the tube 8 and is blown by air in the customary way. This can be done by one or more automatically operating devices, but the diagrammatic showing indicates the blowing of a single glass shape 7.

The blowing is continued for such a time as to enlarge substantially the shape 7 until its walls become exceedingly thin, so thin as to show iridescent colors. The wall thicknesses can extend over a considerable range, say from a few thousandths of an inch downwardly, but since the thinner the fragments the stronger the glass, the presently preferred wall thickness is measured in microns; for example, 20 microns or the like, or can even be so thin as to show no color at all. When the body has been sufficiently expanded, it is still out of contact with the chamber 6. The body is generally of an approximately spherical shape, as shown. When the walls of the body have become acceptably thin, they are suddenly shattered when the blowing pressure is increased sufficiently, preferably as an intense pulse.

Alternatively, the blowing air can be introduced at an approximately constant rate. The glass body enlarges while it is still soft, but as it cools and solidifies, it no longer expands and the incoming air then increases in pressure until the body shatters. The rate of air influx can be greater than is normally used in blowing articles without molds and that must remain intact. The rate of producing and shattering a glass body can therefore be quite rapid and the rate of production of fragments is quite high.

The shattering glass body 7 bursts into innumerable films, particles or fragments. These fractions or fragments are irregular in outline, are very thin, and since the parent body was approximately a sphere, are curved in two directions or dimensions. The curvature is relatively slight, or, in other words, the radius of curvature is relatively large with respect to the thickness. The flexibility of the fragments is sufficient so that they can, by flexing, be made nearly or entirely flat. Until they are flexed, however, they are somewhat dished or curved. The terminology herein utilizes the term "curved" or "substantially flat or planar" in referring to these fragments prior to flexing. These are simply general designations without characterizing the fragments accurately from the geometrical aspect. If the fragments are sufficiently thin, they transmit but do not reflect light in the visible spectrum; or, if they are a little bit thicker, they may give rise to optical interference patterns.

In any event, the fragments or chips of the shattered body 7 fall by gravity within the chamber 6 until they encounter a sifting sizing screen 9 stretched across the open bottom of the enclosure. Those of too large a size are held back whereas other fragments of a size to pass the screen, say about one square centimeter in area, continue to fall therefrom by gravity. Reference to fragments of too large a size is not intended to refer so much to the area of the fragments as it is to the thickness. Large area as such is not now considered to be harmful but it usually is accompanied by excessive thickness, a thickness so great as to impair the flexing and flattening of the particles. Hence, the sizing screen 9 is intended to represent diagrammatically a means of holding back harmful or undesired particles. These can be disposed of in various ways, some of which appear hereinafter.

Because of their slight curvature, the fragments passing the screen tend to fall flatwise with the convex side down and eventually are intercepted on a fine screen 11, such as a bronze mosquito wire, resting on a suitable support 12. The fragments 13 (diagrammatically represented as flakes) tend to fall with the same general orientation; that is, with their major dimensions approximately in a horizontal plane. They settle upon the screen 11 and lie next to each other and overlapping each other to provide a plurality of layers. The fragments 13 are in somewhat random arrangement on the screen 11 but in any event form a sort of sheet 14. The thickness of the sheet can be any selected value, in one example being about one-quarter of an inch in thickness and covering the screen over a substantial area much larger than the area of any individual fragment. The fragments generally are in fairly close contact with each other along different lines and points while between the parts in contact there remain interstices or voids of relatively small dimensions, so small that air convection is substantially suppressed.

According to one process of my invention the support 12 is lowered to another station. The sheet 14 of fragments can be further processed in dry form but preferably is impregnated with a liquid material preferably of a plastic sort which flows into the tiny interstices between the fragments and joins them, at least at their points of contact, displacing corresponding volumes of the air as it goes. The travel of the impregnating material is largely by capillarity and, if sufficient impregnant is supplied, the spaces are very nearly or are entirely filled. It is important to have the plastic wet the glass well. Preferably, there is added a surface layer 16 of any suitable sort, such as wire reinforced plastic or glass contacting the glass fragments and also wet by the plastic. The plastic is then solidified by any suitable means; for example, polymerization by heating. Heating for polymerization is effective in some thermosetting plastics, in the region of, say, 200 degrees F. although in other suitable plastics polymerization can be carried out at room temperatures if appropriate accelerators and plastics are used. The important point is to treat the plastic so as to produce solidification, and it is considered beneficial to have the solidification occur quickly. After the withdrawal of the wire screen 11, there results a finished sheet of solid material having some translucency to the visible spectrum. The sheet is even transparent in the event the fragment sizes and orientations are correct and providing that the impregnating material is clear or transparent and that the indices of refraction of the glass and of the plastic are very nearly identical. In most cases the reflection and absorption coefficients for visible light are low. This structure, usually capable of transmitting light, is a new article of manufacture, very strong in two directions at right angles to each other and parallel to or in the plane of the article. The surprisingly high strength of the new product can perhaps be emphasized by first considering a sheet of glass fibres all laid in one direction and held to each other by plastic. In the direction of the fibres, the sheet has the tensile strength of the fibres, but in a cross direction, the sheet has only the tensile strength of the plastic. If another sheet is made up of fibres woven at right angles and held together by plastic, there is attained a fair tensile strength in the two directions of the fibres, but the fibres are no longer straight, but sinuous, and cannot be put as close together. The strength in the cross direction is greater than before, but the maximum tensile strength is less. Usually the flexural strength is important and this depends upon tensile strength and the tensile strength in the direction related to the direction of flexure. If, as disclosed herein, the sheet is made up of thin glass fragments or flakes secured by plastic, there is tensile and so flexural strength in at least two directions at right angles to each other and in fact in all directions substantially parallel to the flakes, since the individual flakes themselves are strong in tension in all directions in their approximate planes. Also, the flakes are nearly or quite straight and not sinuous, and pack together much closer than any weave. In a given volume there is a high percentage of glass of high strength and only a small amount of lower strength plastic. The plastic itself, being small in amount and wetting the glass well is necessarily thin and so transmits stresses effectively from glass fragment to glass fragment. These factors, and possibly others, establish a product which is exceedingly strong and effective in at least two perpendicular directions, and in most embodiments, in all directions along the approximate plane of the sheet.

Instead of removing the sheet 14 of relatively loose glass fragments and the screen 11 from the support 12, as shown in FIGURE 1A, the screen 11 and the sheet 14 can be transferred along the support 12, as indicated by the arrow 17, to another support 18 through an air lock 19 or guard chamber and into a vacuum chamber 20. This particular space has a connection 21 to an evacuating device and there is provided in it a nozzle 22 or equivalent structure for introducing an impregnating material in vapor form; for example, a fluid thermo plastic or a material capable of polymerization. The relative temperatures are such that the introduced fragments condense somewhat the vapor upon their surfaces. The condensate may be of the sort to reduce reflection, as used in optical lenses. The vaporized material coats the individual particles in the layer 14 and, as liquid, is drawn between the particles by capillarity to fill the interstices therebetween and to expel any remaining air therefrom. It is usually advisable following this treatment also to introduce further plastic in liquid form. Alternatively, another nozzle 23 can be provided for introducing a treating substance in relatively coarse spray form, such as a cement in solvent, for the purpose of wetting the individual fragments, filling the interstices therebetween and, upon evaporation of the solvent, providing a sort of binder for the discrete particles or fragments. Introduction of a body of liquid plastic can follow here, also, if desired.

Following this treatment and the thorough impregnation of the sheet, it is expelled from the chamber 20 through a second guard chamber 24 or air lock and as indicated by the arrow 26, and upon solidification is removed from the processing mechanism. The sheet is available for use after stripping of the fundamental supporting screen 11 although, in some instances, the screen is left in position as a further reinforcement. Even without the screen the resulting sheet is comprised of innumerable, somewhat curved glass fragments that are very thin, irregular in outline and are situated in similar orientation in successive layers parallel to the sheet and overlapping each other to a large extent. The glass fragments in many places are in contact with each other. There are also many interstices. These were originally voids. They were filled with liquid material which wet much of the surface of the fragments and finally solidified. The final composite glass and plastic solid sheet is effective to pass radiation but more especially, is effective as a structural member with very great strength in at least two directions or dimensions.

The glass fragments having just been formed or being "nascent" are quite clean when they first deposit and come into contact with each other with substantially no intervening material, and match closely in restricted areas. Intermolecular forces in the clean glass fragments therefore come into play so that it becomes very difficult to separate the individual fragments. It is even possible with fragments of sufficient area, by deforming them into somewhat flatter particles or, in effect by making flat flakes of them, to have them so close together that their clean surfaces cohere. Even without a binder of plastic material the glass flakes cohere with such force that they afford a structural sheet suitable for many purposes. It is preferred, however, in most instances to utilize a filler and binder to assist in holding the particles together and particularly to fill the interstices to the exclusion of air.

If the finished structural sheet is not to be flat or is not to have the shape of the screen 11, its plastic binder can be only partly polymerized prior to removal from the mechanism. It can then be readily shaped or curved by pressing in molds, or the like and then the polymerization of the plastic can be completed to hold the sheet in the desired configuration.

Some variations of the methods previously described are shown in FIGURE 2. In this instance, there is provided a chamber 31 having a source of blowing air 32 for the purpose of enlarging a gob of glass into a hollow cylindrical body 33, the walls of which are curved in several dimensions. The molten glass body 33 is overblown until it shatters into fragments. Another way to fracture the cylinder is to blow it to the requisite wall thinness without overblowing. The pressure is maintained and a knife penetrates the glass wall near the tube. The cylinder splits open and forms relatively large sheets of thin glass. Some of the fragments are spherical sections, as in the case of the FIGURE 1A showing, but others of the fragments, those from the circular cylindrical portion of the body 33, are curved in a cylindrical fashion and can therefore be flattened with far less internal strain. These fragments have very smooth surfaces and are very clean so that when they come into close contact they are held together by intermolecular forces. When the particles or fragments from the shattered body 33 fall, they pass through a sizing screen 34 so that only particles of a given size or smaller continue to drop. These pass downwardly by gravity through the atmosphere and come to rest in a container 36 on a supporting conveyor 37. The fragments or particles continue to deposit, orienting themselves substantially in the same general direction.

Myriads of them are deposited in the container 36, some overlapping the others, some in small area contact with others and some with interstices therebetween, so that the entire area of the container 36 is uniformly, or nearly uniformly, covered. Then the filled container 36 enters into a chamber 38 in which a vacuum is produced by a suitable connection 39 to a vacuum pump. Much of the air previously in the interstices between the fragments is withdrawn as the pressure is lowered and the fragments are made to cohere even closer together than before, the individual fragments being flexed to a considerable extent. The container 36, largely air-evacuated and holding the somewhat flexed fragments is then provided, through a filler pipe 41, with a suitable binding material such as a thermo setting plastic effective to wet the glass. This is introduced into the container 36 to a convenient level sufficient, usually, to submerge the deposited fragments.

The container 36 is then advanced to a subsequent station in which a ram 42 operating within the chamber 38 descends to compress and deform the blanket or sheet of fragments and plastic to an even lesser aggregate thickness. The particles or fragments are made then nearly planar or quite planar, are forced into very close contact, and any excess air or excess filler for the interstices is expressed. Since the individual fragments or flaks are very close together and have only a thin film of bonding material between them, the fragments are joined with great firmness. The percentage of glass in the total volume is quite high, so augmenting the strength of the product. The compacted sheet 43 then advances to a heating oven 44 as the impregnating material is thermo setting. Although shown in FIGURE 2 as separate, the chamber 38 and the oven 44 can be combined, at least to an extent sufficient to permit the ram 42 to maintain pressure upon the contents of the container 36 while the heating operation proceeds and until the sheet 43 is cured. In the oven 44 sources of heat 46 are operated so that the previously liquid, plastic impregnant is solidified. At the conclusion of that operation, the sheet 43 is removed from the oven 44 into the atmosphere at a station 47 and the plastic impregnated sheet made up of glass fragments is removed from the container 36 and is available for use.

A further process of producing a product of this sort is afforded by the use of a chamber 51 provided with a glass blowing member 52 effective to blow a molten glass gob into a hollow body 53. Blowing proceeds until the body has extremely thin walls which shatter under the blowing pressure. The falling glass fragments are of the characteristics previously described and those of the appropriate dimensions pass through a sizing screen 54 while those that are too large are retained. Those passing the screen 54 drop into a subjacent chamber 56 in which an ionizing mechanism 57 is provided. The particular polarity of the mechanism 57 is not material. The important point is that by ionizing the atmosphere through which the fragments fall, it is possible also to control the electrical charge on the fragments. If the charge is excessive, the fragments tend to stand on end. The charge is therefore so regulated that the particles fall and deposit flatwise. With an appropriate amount of charge the particles all tend readily to orient themselves in the same general direction and to fall appropriately and to discharge in an appropriately connected container 58 mounted on a suitable support 59. The effectiveness of the charged glass particles is enhanced since the charges tend to assist the fragments in arranging themselves in the container 58 in a more nearly uniform and regular fashion. But when the particles discharge they contact each other quite readily and then tend to cohere.

A draft of air through the screen bottom of the container 58 and through the mass of fragments descending thereon may also be used as an aid in obtaining a more nearly uniform blanket of fragments, largely because the air tends to flow through the sparser areas and to carry fragments there. The current of air is more intense where the layer is thin, thus the arrangement tends to produce a uniform layer.

The deposited fragments then advance with their container 58 into a chamber 61 connected to a source of vacuum through a conduit 62 acting through the screen bottom 63 of the container. The withdrawal of air through the vacuum conduit 62 reduces the volume of the interstices between the particles and well prepares them for subsequent treatment; for example, as shown in any of the preceding or following figures. While FIGURE 3 shows the evacuating step as separate, it is usually preferred to impose the vacuum on the chamber 56 as the fragments are falling thus assisting in producing a more nearly uniform layer. Further, it is also usually preferred to continue the evacuated condition at least until the plastic impregnation step has been carried out. This has the benefit of removing all gas except that dissolved in the glass itself and possibly except for an adsorbed gas layer on the glass surface, although the adsorbed gas is small in amount and probably goes into solution in the impregnating liquid. The dissolved gas does no harm and hence the vacuum step need not be accompanied by a heating step for outgassing.

A still further variation in the process is afforded by mechanism as shown in FIGURE 4. In this instance there is provided a blowing chamber 66 in which a hollow circular cylindrical glass body 67 is formed. The glass body is enlarged and expanded until its walls are the desired thinness, at which time it is shattered into thin glass fragments of various size. Those under a predetermined size fall through a sizing screen 68 and into a liquid bath 69 in an enclosing chamber 71. During this time liquid under pressure flows toward the chamber 71 through a conduit 72 and is directed by an appropriate valve 73 to flow through an inlet 74 near the top of the chamber 71. The liquid travels downwardly accelerating the falling fragments and tending to pack them onto the screen bottom 76 of a container 77.

The container 77 rests over an outlet duct 78 leading to a conduit 79 connected through the valve 73 with a discharge pipe 81. The arrangement is effective to provide a continuous circulation of liquid in a downward direction through the chamber 71 as the glass fragments are depositing on the screen 76. It is particularly effective to force the glass fragments into very close contact with each other, to expel entrapped air from between them, and leave a minimum of liquid in the interstices. The liquid stream assists in the preferential deposit of fragments so that the thin portions are built up to result in a substantially uniform layer. Abrupt horizontal shaking of the container and the deposited fragments can be used to afford a more compact layer.

Subsequently the particles are to be removed from the container in the form of a sheet. It is then only necessary to reverse the valve 73 thereby reversing the direction of the flow of the fluid in the pipes 74 and 79. The liquid flow is then upwardly through the chamber 71. The container 77 is retained so that the layer or sheet of glass fragments is lifted from it substantially as a body and can then be removed for further processing as desired. As a variation, the liquid level can be lowered momentarily and the container and its fragments are removed for separation of the container from the fragments which are further processed.

Alternatively, the cycle just described can be reversed in order. The valve 73 is so positioned as to afford a rising current of liquid through the chamber 71 as the glass fragments tend to fall by gravity therethrough. It is thus possible to select the size of the fragments deposited since those that are too light will pass out through the duct 74 to discharge through the pipe 81, and only those over a certain ratio of surface to mass will continue to fall slowly onto the screen in the container 77.

When that container is filled with sufficient glass fragments to provide the desired sheet thickness, the hydraulic flow is then reversed by reversing the valve 73. The final flow is then downwardly through the chamber 71 and acts to compress or compact the deposited and sized particles firmly on the screen 76 in the container. The compacted fragments can then be removed with the container for further processing in accordance with any of the other arrangements described herein.

While preferably liquid is utilized in most installations in connection with the FIGURE 4 device, it is also possible to replace the liquid with a current of gas, such as air or carbon dioxide, and to produce a substantially similar effect. One of the distinctions is, however, that the density of the liquid and of the gas are usually so much different that the sizing of the particles correspondingly differs. Furthermore, with gas treatment, the interstices in the resulting fragment sheet are filled with gas rather than liquid. If the liquid utilized is a suitable plastic subject to subsequent solidification or setting it is not necessary to dislodge or replace it. On the other hand, if gas is utilized it is usually necessary to dislodge it and replace it with a thermo setting or polymerizable plastic binder.

As appears in the diagram of FIGURE 5, a somewhat more elaborate process can be carried out to produce an appropriate final glass plastic product. In this instance, a plurality of glass blowing tubes 91 and 92 are mounted on a revolving frame 93 so that in one station of the frame 93 a glass body 94 is presented in an otherwise substantially closed blowing chamber 96. The body 94 is a sphere or is approximately circular cylindrical in most of its contour depending upon the gob shape and is expanded, as before, until it shatters into glass fragments of an appropriate thickness. A succeeding tube 92 swings into position and the molten glass gob carried by it is in turn fragmented. A succession of fragmentations occurs at the desired rate.

The fragments do not fall by gravity. Rather, they tend to rise because a current of air or other gas is induced to flow upwardly through the chamber 96 by the provision of a suitable blower 97 or fan. Some of the glass fragments, even so, are of a size to mass ratio so that they fall onto a lower screen 98. Other fragments, too large in area to fall, are also too great to pass through a grille 99 or grid at the upper part of the chamber. The smaller fragments continue to rise out of the chamber 96 but the larger ones are stopped on the grille 99. A toothed roller 101 on a reciprocating frame 102 meshes with the transverse bars of the grille 99 and crushes into small particles any fragments that become lodged on the grille, suitable precaution being taken to prevent sticking of the glass fragments or particles. There is consequently discharged with the current of air flowing from the chamber 96 a more or less continuous stream of glass fragments of appropriate size range.

These are carried through an intervening passageway 103 by the current of the air from the fan 97 and finally fall onto a perforated conveyor 104 or traveling screen belt. This is conveniently trained around a pair of pulleys 106 and 107 appropriately driven with the upper run of the belt traveling toward the left, in FIGURE 5. Any glass fragments which fall through the meshes of the belt are caught in a tray 110 and are discharged through a tube 108 for further handling. The deposit on the belt is sufficiently thick to form a substantially continuous, multi-layer blanket 109 of glass particles or fragments of the type described. The speed of advance of the belt is so adjusted that the thickness of the layer or sheet deposited is appropriate.

As the belt advances it travels to a station outside of the chamber 110 and over a collecting tray 111 having a drain tube 112 for any material falling through the belt. At the exterior station there is provided a reciprocating platen 113 having a perforated bottom 114 and connected by a pipe 116 to a source of vacuum. When the platen 113 is lowered into contact with the glass fragments on the belt 104 and the vacuum is imposed upon the deposited particles, they are lifted off the belt and follow the platen in its rising movement. The stripped belt is then returned in the lower run for further operation.

The sheet of glass fragments held by atmospheric pressure on the lower side 114 of the platen 113 is then traversed to another station and onto a nether supporting plate 118, preferably of lightly waxed steel. The platen reciprocates, as indicated, and when in position over the supporting plate 118 is deprived of its vacuum so that the glass fragments are deposited on the plate 118. When one layer of glass fragments has been deposited, another plate 118 is disposed on top of it and the cycle is repeated until a stack of alternating plates and sheets of glass fragments is made. If desired, cover sheets are disposed each side of the glass fragment layer, making a sandwich.

This entire stack is then transferred into a chamber 119, is subject therein not only to compression by a lowering ram 121 but is also subject to evacuation through a duct 122 leading to an appropriate vacuum pump. In this way the glass fragments are flattened, are compacted, are forced into intimate contact with each other insofar as possible and much of the interstitial air is withdrawn. If desired, stops can be used to insure uniform sheet thickness. Plastic is then admitted to the chamber 119 through a duct 123 and impregnates the entire assembly. Preferably, the plastic is of a sort which wets and adheres well to the glass fragments but does not adhere to the intervening plates nor to the walls of the chamber 119.

Following such treatment, the remaining liquid plastic is removed through a drain line 124 and the pile of altered plates and sheets of glass is transferred to an oven 126, having a heating element 127 therein. The plastic, assuming it is a thermo setting or heat polymerizing plastic, changes from liquid to solid form while occupying the interstices of the glass fragment sheets. In the event the plastic polymerizes into solid form without elevated temperatures, the heating step can be omitted. In either case, the composite sheets of glass fragments and plastic solidify into a somewhat irregular, generally planar shape. Following their removal from the chamber 126, or when they are substantially solid, they are separated from the supporting plates and are individually subjected to an edge trimming operation by a knife 128 or grinder to make them of uniform size for use.

When the impregnating plastic is transparent, interesting results are obtained. If the indices of refraction of the bonding material and of the glass are nearly the same, the whole sheet becomes nearly transparent. If the glass pieces are exceedingly thin they do not reflect even in a material of different index of refraction. In intermediate thicknesses, iridescent effects can be obtained. Color can also be added to the plastic. In cases where great strength is not needed, a heterogeneous layer of randomly oriented, small flakes of glass of appropriate thickness may be used for ornamental purposes.

It is possible to depend more upon electrical charges to assist in properly orienting and depositing the glass fragments descending for subsequent use. As shown particularly in FIGURE 6, glass fragments fall from a chamber 131 after having been formed in any of the ways previously described. The fragments descend within the chamber 131 past an ionizing device 132 which ionizes the contained air in the chamber and imposes electrical charges on the various descending glass fragments. In addition to the ionizing mechanism 132, there is provided a conductor 133 connected to the support 134 onto which the particles tend to fall. This is effective to discharge the previously charged glass fragments. It is even possible to have a charge of the opposite sign imposed upon the support 134. This, in effect, tends to keep the similarly charged falling fragments separate from each other (due to charge repulsion) but tends to attract the charged fragments strongly to the support 134 (due to charge attraction) and to arrange and to compact them on the support in the desired fashion. Whenever there is a sufficient deposit, the electrical connection 133 is broken, the support 134 is removed from the chamber with its load of appropriately oriented and deposited glass fragments and further treatment progresses as previously described.

Electrical charges can be further utilized in a process diagrammatically illustrated in FIGURE 7. In this instance, a supply or group of appropriate glass fragments prepared in any suitable way as previously described enters the mechanism through a grid-lined duct 141 possessed of positive charges. For example, these are impressed upon the duct grid (not shown) to repel the particles by a mechanism such as the device 132 of FIGURE 6. The particles entering in the group through the duct 141 are all given a charge of the same sign, say an electrically positive charge. After they round a bend in the duct 141 and are free to fall by gravity, they pass further through a continuation of the grid-lined duct 141 in the form of an enclosing grid 142 having an electrical connection 143 to continue the polarization of the grid and to continue the positive charge on the falling glass fragments. The grid 142 terminates just above the upper run of a traveling conveyor belt 144 trained around a pulley 146 and advancing in the direction of the arrow 147 in FIGURE 7.

Just prior to the time that the belt 144 enters beneath the grid 142, it passes under a mechanism 148 effective to impress an electrical charge of the opposite sign on the belt 144. In this instance, since it is assumed that the particles entering through the duct 141 are positively charged, the belt 144 just prior to passing beneath the grid 142 is given a negative charge. Thus, one stream of particles deposits on the belt 144 under the additional force due to the opposite charges between the particles in the duct and on the belt. The particles then effectively discharge onto the belt and rest on the belt with the particles and the belt substantially neutralized. The effect of the opposite electrical charges is to assure the deposit of a uniform, properly oriented layer or blanket of glass fragments on the advancing belt.

In addition to the duct 141, there is provided a second grid-lined duct 151 connected to a suitable source of glass fragments and provided with a grid 152 having an electrical connection 153 so that the grid 152 is given a negative electrical charge and imparts a similar electrically negative charge to the glass fragments falling from the duct 151. Just prior to the time that the approximately neutralized belt and its cargo enter beneath the grid 152, they pass under a mechanism 154 effective to impose electrical charges on the subjacent fragments and belt and of a positive sign. Thus the belt and fragments entering beneath the grid 152 are positively charged whereas the fragments descending through the grid 152 and the grid itself are negatively charged. The extra layer is attracted by the opposite electrical charges to the belt and the already existing layer deposited thereon, and a compact two layer sheet then emerges from beneath the grid 152. This layer depositing operation is multiplied or repeated any number of times to provide an accumulation of fragments of the desired thickness. The charges, having approximately neutralized each other, leave the deposit and the belt approximately neutral as they enter into a treatment chamber 156 within which the deposited layers are appropriately impregnated and solidified, or approximately so, so that upon its emergence from the chamber 156 the deposited material can be stripped off and cut into appropriate shapes, or otherwise treated.

As another application of various of the elements described herein, there is provided, as shown in FIGURE 8, apparatus for carrying out a variation of the process. In this instance, the appropriately formed glass fragments enter through a duct 161 into a chamber 162. Since it is desired that the air within the chamber and duct be appropriately ionized, and that the particles be properly charged, there is provided not only a mechanism 163 for electrically ionizing the air but the walls of the duct 161 and of the chamber 162 are lined with a grid mechanism 164 having appropriate electric connections so that the charged particles within the duct and chamber are not drawn to the walls of the duct and discharged but rather are repelled therefrom and continue to float.

The fragments that enter the chamber 162 are subjected to an up-draft of air entering through an opening 166 in the bottom of the chamber and passing over a screen 167. The air is induced to flow in the upward direction by a mechanical fan 168 at the upper end of the chamber driven by suitable means 169. Particles passing by the fan 168 travel through a transfer pipe 171 into a chamber 172. The walls of the transfer pipe 171 and those of the chamber 172 are also lined with a grid 173 so that the charged particles are maintained away from the walls. The fan 168 is preferably connected to the grid structure so that particles or fragments tend to repel from the material of the fan.

As the particles pass into the chamber 172, they fall by gravity through a transverse zone distinguished by a plurality of mechanisms 174 appropriately connected into an electrical circuit. The mechanisms 174 alternately ionize the air between them to opposite signs. One group of particles falling through the ionizing zone is given a charge of one sign and then a succeeding group of particles is given a charge of the opposite sign. When the first group of particles falls onto a container 176 at the bottom of the chamber 172, it discharges itself and neutralizes itself in the container after it has exerted an attractive force on the following group of particles which is oppositely charged. Thus, by alternating the charges, the successive groups of particles falling through the chamber 172 are made to compact themselves into layers of the desired density on the supporting container 176. The processsing of the blanket or sheet of glass fragments so deposited on the container 176 is subsequently carried out as previously described.

Another variation in the process to produce an appropriate final product is illustrated in FIGURE 9. In this case, an offset chamber 181 is provided with a glass blowing tube 182 from which a hollow glass body 183 is blown. When the body has been expanded to have a sufficiently thin wall, it is shattered and the fragments tend to fall by gravity. Those that are extra large fall directly into a sump compartment 184 forming part of the chamber 181 whereas lighter ones are entrained in an up-draft of air flowing from an inlet pipe 185 toward the top of the chamber 181. A grid-lined transfer duct 186 leads from the chamber 181 into grid-lined twin chambers 187 and 188. Preferably, the walls of the chambers 187 and 188 in addition to the grid-lining (not shown) are in part at least defined by enclosing grids 189 and 191, connected by suitable conductors 192 and 193 to impose charges of opposite signs on the groups of particles flowing through the grids 189 and 191.

Beneath such twin grids is disposed a drum 193 mounted on a suitable shaft 194 and driven so that it preferably revolves in the direction of the arrow 196. If desired, the drum may be covered with a sheet of plastic. As the drum revolves, glass fragments are deposited upon it, or upon the plastic cover sheet, first from the interior of the grid 189 and most particles as they deposit have a positive charge. If the drum is of insulating material, the particles do not discharge, at least not until such time as they advance beneath the outlet of the second grid 191 having a negative charge. Since the particle layer already on the drum is positively charged, it serves to attract the falling, negatively charged particles from the second grid 191 so that the second layer and the first layer are very firmly compacted together by the charges which mutually attract and then discharge each other. The particles are so properly oriented and arranged. As the two deposited layers advance on the drum, they are subjected to a spray or coating of plastic material 196 emerging from a nozzle 197 and effective to wet the fragments and to adhere to the drum also. The layers of glass fragments deposited on the rotating drum are made into an adhering sheet. The drum continues to rotate and layer after layer of fragments of glass are deposited on top of each other and adhesively coated until the desired radial thickness is reached.

When a layer of adequate thickness has been deposited on the drum, the drum is stopped and the layer is radially severed along the axial length of the drum, as indicated by the line 198. Following that, the layer is stripped from the drum and is flattened into a sheet 199 on an appropriate supporting plate 201. The plate 201 beneath the layer or sheet can be supplemented if desired, by a superposed plate 202. Both the plates 201 and 202 are preferably of a material serving to afford a smooth surface next to the intervening glass fragment sheet and to be compatible with the impregnating material in the glass fragment sheet. The plates 201 and 202 are also preferably permeable to radiation often, although not necessarily radiation in the visible spectrum, and have as much strength as is normally available in continuous sheets. However, the intervening glass fragment sheet 199 is relied upon for the major part of the structural strength of the resulting product. After the upper plate 202 has been applied, the assembly travels to a station 203 for a further treatment such as impregnation with plastic material and cure by polymerization or thermal means as previously described.

In several of the preceding, various embodiments of the invention, electric grids or discharging points are diagrammatically illustrated and grid linings are referred to although not illustrated. When sufficiently high potential is employed, a glow discharge results and the fragments are appropriately charged. While discharging points are often used to illustrate the presence of such discharge no such convention is used herein and both the points and the grid are intended to represent that condition, if desired. Similarly, at a lower potential, the particles are merely repelled without themselves being charged and both the discharging points and the grids are intended to represent that condition, if desired.

In all variations of the process of my invention, there is provided a way of affording a new article of manufacture comprised of a myriad of clean or nascent glass fragments substantially flat and approximately planar, or only slightly curved, very thin, in fact usually, although not necessarily, so thin as to be measured in optical units by interference patterns and the like, of irregular outline of varying dimensions and varying surface to mass ratios. The fragments are arranged with substantially the same general orientation; that is, with the approximate plane of the individual fragments all approximately parallel and with the fragments touching each other wherever possible and arranged in layers to overlie each other leaving some voids or interstices between the glass fragments. The voids or interstices are not left empty but are preferably completely filled with an impregnating material liquid when first applied but subsequently solidified to afford a binder for the entire body. The resulting product is structurally extremely strong in at least two directions or dimensions, if appropriately made can be translucent or sometimes even transparent, and is exceedingly useful as a structural member.

What is claimed is:

1. A process of forming a structurally strong sheet comprising forming a thin-walled, hollow glass shape, breaking said shape into substantially flat, irregularly outlined glass fragments, dropping said fragments, imparting electrical charges to said dropping fragments, intercepting said dropping, charged fragments over a predetermined area until a sheet made up of layers of said overlapped fragments is formed, neutralizing said electrical charges, and replacing air between said fragments with a plastic.

2. A process of forming a sheet comprising blowing a hollow molten glass shape until said shape shatters into thin fragments irregularly shaped and substantially flat, dividing said fragments into first and second groups, imparting electrical charges of opposite sign to said fragments in each of said groups, providing a support for said fragments, first imparting an electrical charge of one sign to said support in the presence of said first group of fragments of the opposite sign, permitting said first group of fragments to lodge on said support under the impetus of said electrical charges of opposite sign, then imparting an electrical charge of the other sign to said support and said lodged fragments of said first group in the presence of said fragments of said second group of the opposite sign, permitting said second group of fragments to lodge on said support and on said lodged first group of fragments under the impetus of said electrical charges of opposite sign to build up a plurality of layers made up of overlapped fragments in part touching each other and in part spaced to leave interstices, filling said interstices with plastic, and solidifying said plastic.

References Cited in the file of this patent

UNITED STATES PATENTS

| | | |
|---|---|---|
| 726,485 | Whitney | Apr. 28, 1903 |
| 2,233,259 | Harth | Feb. 25, 1941 |
| 2,311,613 | Slayter | Feb. 16, 1943 |
| 2,386,511 | Slayter et al. | Oct. 9, 1945 |
| 2,430,123 | Jacob | Nov. 4, 1947 |
| 2,466,906 | Miller | Apr. 12, 1949 |
| 2,479,357 | Hill et al. | Aug. 16, 1949 |